US010209440B2

(12) United States Patent
Lee et al.

(10) Patent No.: US 10,209,440 B2
(45) Date of Patent: Feb. 19, 2019

(54) IMAGING SENSOR WITH BRAGG FILTER AND METHOD OF MANUFACTURING THE SAME

(71) Applicant: ELECTRONICS AND TELECOMMUNICATIONS RESEARCH INSTITUTE, Daejeon (KR)

(72) Inventors: Mun Seob Lee, Daejeon (KR); Nack Woo Kim, Seoul (KR); Gi Hyeon Min, Icheon-si (KR); Byung-Tak Lee, Suwon-si (KR); Young Sun Kim, Gwangju (KR); Sim-Kwon Yoon, Gwangju (KR); Dae Won Choi, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/248,874

(22) Filed: Aug. 26, 2016

(65) Prior Publication Data
US 2017/0227707 A1 Aug. 10, 2017

(30) Foreign Application Priority Data
Feb. 5, 2016 (KR) .................. 10-2016-0015255

(51) Int. Cl.
H04N 5/335 (2011.01)
H04N 3/14 (2006.01)
G02B 6/08 (2006.01)
G02B 6/02 (2006.01)
G02B 6/32 (2006.01)
H04N 9/04 (2006.01)
(Continued)

(52) U.S. Cl.
CPC ............... *G02B 6/08* (2013.01); *G02B 6/021* (2013.01); *G02B 6/32* (2013.01); *H04N 5/2254* (2013.01); *H04N 9/045* (2013.01); *G02B 3/0056* (2013.01)

(58) Field of Classification Search
CPC .......... G01J 3/18; G01J 3/0205; G01J 3/0218; G01J 3/1895; G01J 3/36; B01L 2300/0663; H04N 5/2254
See application file for complete search history.

(56) References Cited

U.S. PATENT DOCUMENTS 5,982,962 A * 11/1999 Koops ................ G02B 6/02057
385/37
6,233,373 B1 * 5/2001 Askins ..................... G01J 3/02
356/451

(Continued)

OTHER PUBLICATIONS

Qingli Li et al., "Review of spectral imaging technology in biomedical engineering: achievements and challenges", Journal of Biomedical Optics, vol. 18(10), pp. 100901-1-100901-28, Oct. 2013.

(Continued)

Primary Examiner — Chia Wei A Chen
(74) Attorney, Agent, or Firm — Rabin & Berdo, P.C.

(57) ABSTRACT

An imaging sensor includes at least one fiber Bragg grating for filtering an image from a subject for wavelength bands, and an imaging device for converting an image transmitted through the fiber Bragg grating into a digital signal.

15 Claims, 4 Drawing Sheets

(51) Int. Cl.
*H04N 5/225* (2006.01)
*G02B 3/00* (2006.01)

(56) References Cited

U.S. PATENT DOCUMENTS

| | | | | |
|---|---|---|---|---|
| 6,388,815 | B1* | 5/2002 | Collins, Jr. | G02B 27/0087 359/237 |
| 6,421,481 | B1* | 7/2002 | Sappey | G02B 5/1861 385/10 |
| 6,492,636 | B1* | 12/2002 | Chen | G01B 11/16 250/227.14 |
| 6,525,889 | B1* | 2/2003 | Collins, Jr. | G02B 27/0087 359/237 |
| 6,950,570 | B1* | 9/2005 | Novotny | G02B 6/3588 385/16 |
| 7,714,368 | B2 | 5/2010 | Yang et al. | |
| 8,665,440 | B1* | 3/2014 | Kompaniets | G01N 21/31 356/402 |
| 9,574,939 | B1* | 2/2017 | Zhu | G02F 2/00 |
| 2002/0122626 | A1* | 9/2002 | Rothenberg | G03F 1/34 385/37 |
| 2002/0154387 | A1* | 10/2002 | Mori | G02B 5/288 359/337.1 |
| 2003/0077039 | A1* | 4/2003 | Kurihara | G03F 1/34 385/37 |
| 2003/0081192 | A1* | 5/2003 | Nishi | G03B 27/72 355/69 |
| 2004/0046109 | A1* | 3/2004 | Chen | G01D 5/35303 250/227.14 |
| 2004/0104346 | A1* | 6/2004 | Devitt | G01J 3/0259 250/339.14 |
| 2004/0178329 | A1* | 9/2004 | Kare | G01J 1/04 250/227.11 |
| 2006/0171428 | A1* | 8/2006 | Volodin | H01S 5/065 372/9 |
| 2008/0212916 | A1* | 9/2008 | Duesterberg | G02B 6/024 385/11 |
| 2008/0304123 | A1* | 12/2008 | Wang | A61B 1/00183 359/196.1 |
| 2009/0122407 | A1* | 5/2009 | Hashimoto | B82Y 20/00 359/566 |
| 2009/0270718 | A1* | 10/2009 | Peter | A61B 5/0073 600/411 |
| 2010/0053612 | A1 | 3/2010 | Ou-Yang et al. | |
| 2010/0328743 | A1* | 12/2010 | Wolterink | B29D 11/0073 359/19 |
| 2011/0032398 | A1* | 2/2011 | Lenchenkov | H01L 27/14621 348/294 |
| 2011/0122895 | A1* | 5/2011 | Savage-Leuchs | H01S 3/0941 372/10 |
| 2011/0261358 | A1* | 10/2011 | Volanthen | G01J 3/1895 356/328 |
| 2012/0021525 | A1* | 1/2012 | Fehr | B01L 3/502707 436/94 |
| 2012/0200854 | A1* | 8/2012 | Bland-Hawthorn | G01J 3/02 356/328 |
| 2012/0327248 | A1 | 12/2012 | Tack et al. | |
| 2013/0016349 | A1* | 1/2013 | Effenberger, Jr. | G01J 3/18 356/318 |
| 2013/0135588 | A1* | 5/2013 | Popovich | G02B 27/26 353/8 |
| 2013/0147789 | A1 | 6/2013 | Kim | |
| 2013/0266032 | A1* | 10/2013 | Van Leeuwen | H01S 3/109 372/22 |
| 2013/0286053 | A1* | 10/2013 | Fleck | G09G 3/3208 345/690 |
| 2014/0200438 | A1* | 7/2014 | Millett | A61B 8/0841 600/424 |
| 2014/0247841 | A1* | 9/2014 | Seurin | H01S 3/067 372/6 |
| 2014/0293737 | A1* | 10/2014 | Sangawa | G01N 29/0681 367/7 |
| 2014/0294040 | A1* | 10/2014 | Zhang | G01K 11/32 374/45 |
| 2014/0294041 | A1* | 10/2014 | Zhang | G01F 1/684 374/54 |
| 2015/0092057 | A1 | 4/2015 | Lee | |
| 2015/0177429 | A1 | 6/2015 | Darty | |
| 2015/0223765 | A1* | 8/2015 | Chopra | A61B 6/12 600/424 |
| 2017/0131475 | A1* | 5/2017 | Wehner | G02B 6/29358 |
| 2017/0131681 | A1* | 5/2017 | Sudo | G02B 6/0008 |
| 2017/0139131 | A1* | 5/2017 | Karafin | G02B 6/08 |
| 2017/0214839 | A1* | 7/2017 | Keller | H04N 5/2354 |
| 2017/0243373 | A1* | 8/2017 | Bevensee | G06T 7/80 |

OTHER PUBLICATIONS

Nathan Hagen et al., "Review of snapshot spectral imaging technologies", Optical Engineering, vol. 52(9), pp. 090901-1~090901-23, Sep. 2013.

* cited by examiner

IMAGING SENSOR WITH BRAGG FILTER AND METHOD OF MANUFACTURING THE SAME

CROSS-REFERENCED TO RELATED APPLICATION

The present application claims priority to Korean Patent Application No. 10-2016-0015255, filed on Feb. 5, 2016, in the Korean Intellectual Property Office, the entire disclosure of which is incorporated by reference herein in its entirety.

BACKGROUND

1. Field

An aspect of the present disclosure relates to an imaging sensor and a method of manufacturing the same, and more particularly, to a hyperspectral imaging sensor and a method of manufacturing the same.

2. Description of the Related Art

Spectral imaging is obtained by combining spectroscopy and imaging processing technology, and refers to a technique of analyzing two-dimensional information of a substance and optical information, e.g. wavelengths and frequencies, representing properties of the substance. The spectral imaging uses a method of segmentalizing a wavelength band for each color and measuring the segmentalized wavelength bands, and may be classified into multispectral imaging in which the number of the measured wavelength bands is equal to or smaller than 10 and hyperspectral imaging in which the number of the measured wavelength bands is equal to or greater than 100. The hyperspectral imaging is an imaging technique of segmentalizing imaging information obtained by a general camera into different wavelength information, thereby obtaining up to a few hundreds of wavelength information.

SUMMARY

Embodiments provide an imaging sensor for hyperspectral imaging and a method of manufacturing the same.

According to an aspect of the present disclosure, there is provided an imaging sensor including: at least one fiber Bragg grating configured to filter an image from a subject for wavelength bands; and an imaging device configured to convert an image transmitted through the fiber Bragg grating into a digital signal.

The fiber Bragg grating may be provided in plurality, and the plurality of fiber Bragg gratings may filter the image for different wavelength bands.

The fiber Bragg grating may filter the image for at least some of the wavelength bands, and may provide the imaging device with rays in the other wavelength bands.

The fiber Bragg grating may include a core and a clad surrounding the core, and the core may be doped with germanium. The fiber Bragg grating may include a first region and a second region, which have different refractive indices from each other. Each of the first region and the second region may be provided in plurality, and the plurality of first regions and the plurality of second regions may be alternately disposed.

The imaging sensor may further include a microlens configured to focus an image provided to the fiber Bragg grating. The microlens may be provided one-to-one corresponding to the fiber Bragg grating. The microlens and the fiber Bragg grating corresponding thereto may not be separated from each other but be integrally formed with each other. The microlens may be formed in the shape of a convex lens protruding in the direction of the subject to be photographed.

The imaging sensor may further include a controller configured to receive the digital signal converted by the imaging device and control the imaging device. The imaging device may be a charge coupled device (CCD) sensor, a complementary metal oxide semiconductor (CMOS) sensor, or a bolometer.

According to an aspect of the present disclosure, there is provided a method of manufacturing an imaging sensor including: forming at least one fiber Bragg grating; and allowing an imaging device to correspond to the fiber Bragg grating, wherein the imaging device converts an image transmitted through the fiber Bragg grating.

The forming of the fiber Bragg grating may include: doping germanium into a core; forming a clad surrounding the core; and irradiating ultraviolet rays onto the core using a mask. The mask may include first regions and second regions, which are alternately disposed.

The method may further include providing a microlens in front of the fiber Bragg grating. The microlens may be spaced apart from the fiber Bragg grating. The microlens may be provided one-to-one corresponding to the fiber Bragg grating. The microlens and the fiber Bragg grating corresponding thereto may not be separated from each other but be integrally formed with each other. The microlens may be formed by performing arc discharge on an end of the fiber Bragg grating.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
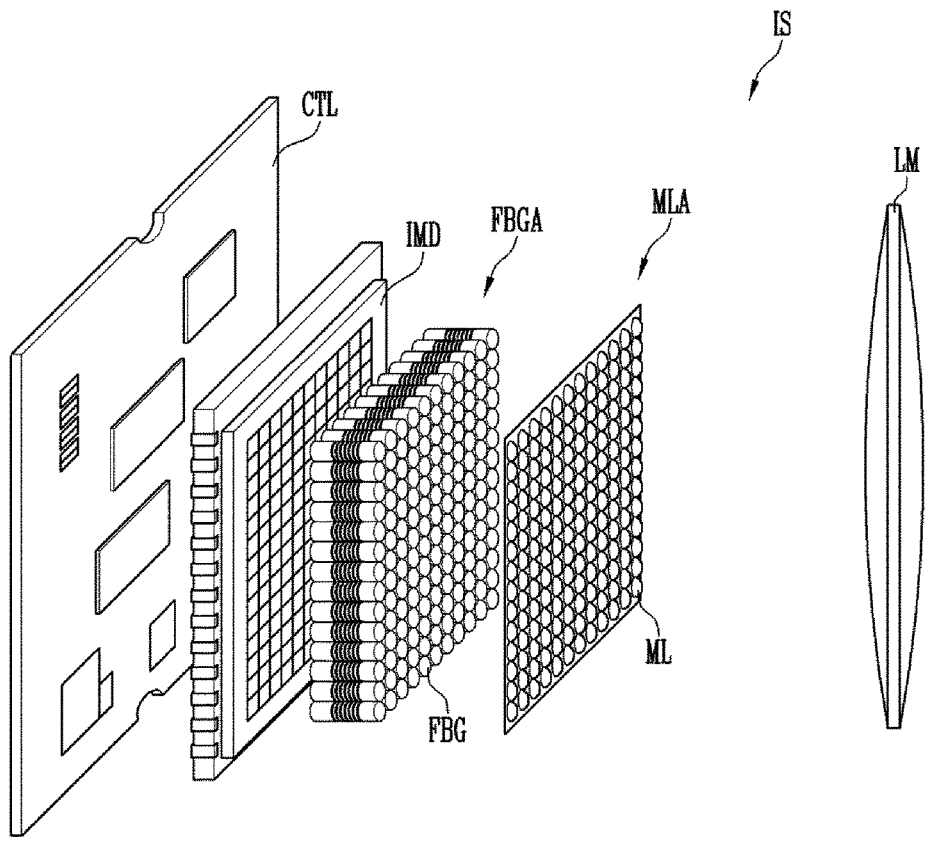
FIG. 1 is an exploded perspective view illustrating an imaging sensor according to an embodiment of the present disclosure.

The present disclosure now is described more fully hereinafter with reference to the accompanying drawings, in which exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Like numbers refer to like elements throughout. In the drawings, the thickness of certain lines, layers, components, elements or features may be exaggerated for clarity. It will be understood that, although the terms "first", "second", etc. may be used herein to describe various elements, these elements should not be limited by these terms. These terms are only used to distinguish one element from another element. Thus, a "first" element discussed below could also be termed a "second" element without departing from the teachings of the present disclosure.

It will be further understood that the terms "includes" and/or "including", when used in this specification, specify the presence of stated features, integers, steps, operations, elements, and/or components, but do not preclude the presence and/or addition of one or more other features, integers, steps, operations, elements, components, and/or groups thereof. Further, an expression that an element such as a layer, region, substrate or plate is placed "on" or "above" another element indicates not only a case where the element is placed "directly on" or "just above" the other element but also a case where a further element is interposed between the element and the other element. On the contrary, an expression that an element such as a layer, region, substrate or plate is placed "beneath" or "below" another element indicates not only a case where the element is placed "directly beneath" or "just below" the other element but also a case where a further element is interposed between the element and the other element.

Hereinafter, exemplary embodiments of the present disclosure will be described in detail with reference to the accompanying drawings.

An imaging sensor of the present disclosure is a spectral imaging sensor that spectrally divides an image from a subject into spectral images for a plurality of wavelength bands and allows an image for each wavelength band to be received by an imaging device, thereby obtaining two-dimensional image data of the subject.

FIG. 1 is an exploded perspective view illustrating an imaging sensor IS according to an embodiment of the present disclosure.

Referring to FIG. 1, the imaging sensor IS includes a fiber Bragg grating array FBGA and an imaging device IMD.

The fiber Bragg grating array FBGA is provided between a subject and the imaging device IMD to filter an image from the subject for each wavelength band. The fiber Bragg grating array FBGA provides the filtered images to the imaging device IMD.

The fiber Bragg grating array FBGA may include at least one fiber Bragg grating FBG. In the embodiment of the present disclosure, the fiber Bragg grating array FBGA includes a plurality of fiber Bragg gratings FBG. The fiber Bragg gratings FBG may be arranged in various forms to form an array, but the present disclosure is not particularly limited thereto. In the embodiment of the present disclosure, the fiber Bragg gratings FBG may be arranged in a matrix form as shown in FIG. 1.

Figure 2A:
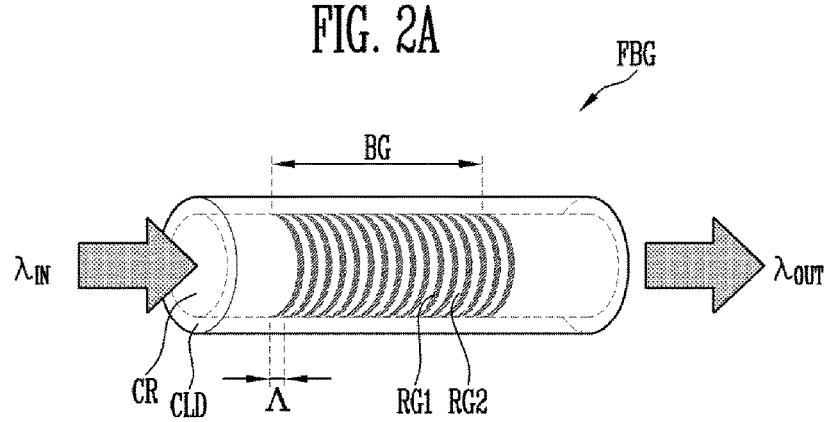
FIG. 2A is a view illustrating a fiber Bragg grating according to the embodiment of the present disclosure.

FIG. 2A is a view illustrating a fiber Bragg grating according to the embodiment of the present disclosure.

Referring to FIG. 2A, the fiber Bragg grating FBG is provided in the form of an optical fiber extending in one direction. Like general optical fibers, the fiber Bragg grating FBG includes a core CR extending in the one direction and a clad CLD surrounding the core CR.

The fiber Bragg grating FBG has a Bragg grid BG in its inside, specifically, the core CR. The Bragg grid FBG includes a first region RG1 and a second region RG2, which have different refractive indices from each other. Each of the first and second regions RG1 and RG2 having different refractive indices is provided in plurality, and the plurality of first regions and the plurality of second regions are alternately disposed, thereby forming the Bragg grid BG. A Bragg wavelength $\lambda_B$ by the Bragg grid BG may be evaluated using the following Formula 1.

$$\lambda_B = 2\Lambda n_{eff} \qquad \text{Formula 1}$$

Here, $\Lambda$ is a pitch of the Bragg grid BG, and $n_{eff}$ is an effective refractive index. When the first and second regions RG1 and RG2 are alternately disposed, the Bragg wavelength $\lambda_B$ is a width of a repetition unit of the first and second regions RG1 and RG2, i.e., a distance from one first region RG1 to the next first region RG1.

The image from the subject passes through the core CR of the fiber Bragg grating FBG, and a portion corresponding to the Bragg wavelength $\lambda_B$ in the image is reflected within the Bragg grid BG. If the wavelength band of an image incident into the core CR of the fiber Bragg grating FBG is $\lambda_{IN}$ and the wavelength band of an image output from the fiber Bragg grating FBG is $\lambda_{OUT}$, the following Formula 2 is satisfied.

$$\lambda_{OUT} = \lambda_{IN} - \lambda_B \qquad \text{Formula 2}$$

As shown in Formula 2, a predetermined region of the image output from the fiber Bragg grating FBG is removed by the Bragg grid BG, and the wavelength band of the image incident into the core CR of the fiber Bragg grating FBG and the wavelength band of the image output from the fiber Bragg grating FBG are changed.

The wavelength of the removed predetermined region is the Bragg wavelength $\lambda_B$, and may be adjusted by controlling the distance between the first and second regions RG1 and RG2. Accordingly, the imaging sensor according to the embodiment of the present disclosure can adjust the wavelength resolution of the fiber Bragg grating FBG. The pitch of the fiber Bragg grating FBG may be variously adjusted, and it is possible to obtain, for example, a resolution up to 0.4 nm through this adjustment. This resolution is ten times greater than that when the existing filters are used.

The range of wavelength bands that can be filtered using the fiber Bragg grating FBG is not limited to visible rays. For example, the range of wavelength bands that can be filtered using the fiber Bragg grating FBG may include not only near-infrared rays but also far-infrared rays, as well as the visible rays. Also, only wavelength bands in a specific range may be densely filtered when necessary. That is, in the imaging sensor according to the embodiment of the present disclosure, the fiber Bragg grating FBG may be controlled such that wide wavelength bands are filtered in a partial region and narrow wavelength bands are filtered in another partial region.

Figure 2B:
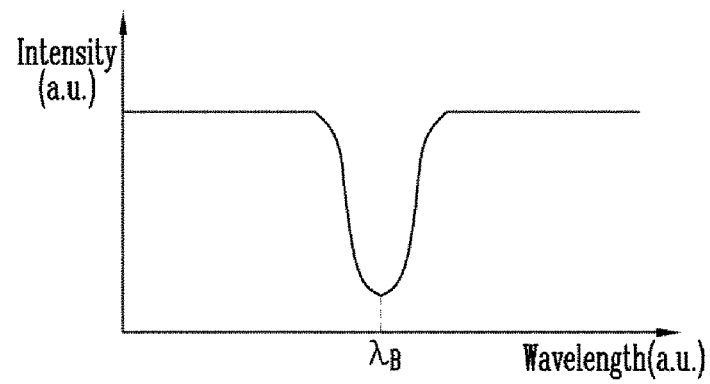
FIG. 2B is a graph illustrating intensities with respect to wavelengths of an image passing through the fiber Bragg grating according to the embodiment of the present disclosure.

FIG. 2B illustrates intensities with respect to wavelengths of an image passing through the fiber Bragg grating according to the embodiment of the present disclosure. An image from a subject entirely has the same intensity before the image passes through the fiber Bragg grating. However, after the image passes through the fiber Bragg grating, the wavelength band of the image, as shown in FIG. 2B, is changed in the form in which a portion corresponding to the Bragg wavelength $\lambda_B$ is removed.

In the embodiment of the present disclosure, a wavelength to be filtered using the fiber Bragg grating FBG may be changed by changing the effective refractive index $n_{eff}$. According to the embodiment of the present disclosure, an image obtained by separating a specific image or a specific color (i.e., a specific wavelength band) among several colors of the image can be acquired using characteristics of the fiber Bragg grating FBG.

In the embodiment of the present disclosure, the fiber Bragg grating FBG corresponds to negative imaging. In positive imaging, a specific color or specific wavelength to be detected is transmitted, and the other wavelengths are reflected to be removed. In the negative imaging, a specific color or specific wavelength to be detected is reflected to be removed, and the other wavelengths are transmitted to be detected. Accordingly, when imaging is performed according to the embodiment of the present disclosure, common imaging of an object is performed for each wavelength band, as compared with the positive imaging. Thus, image resolution is improved, and noise is reduced.

In the embodiment of the present disclosure, the fiber Bragg grating FBG is provided in the form of an optical fiber, and hence loss when the image incident into the optical fiber is small. Also, reflexibility in Bragg reflection is high, and price is cheap.

In the fiber Bragg grating FBG, the size (e.g., the diameter) of the core CR of the used optical fiber may be variously changed. The size of the core CR may be variously changed by considering the size of an image transmitted, the form in which the core CR is coupled to the imaging device IMD, or the like. In the embodiment of the present disclosure, the diameter of the core CR may range from about 1 μm to about 500 μm. For example, the diameter of the core CR may be 9 μm or 62.5 μm., and may reach 400 μm., when necessary.

Referring back to FIG. 1, the imaging device IMD converts, into a digital image signal, the image transmitted through the fiber Bragg grating FGB.

The imaging device IMD is not particularly limited as long as it can receive an image from the fiber Bragg grating FBG and convert the received image into a digital signal. For example, the imaging device IMD may be a charge coupled device (CCD) sensor, a complementary metal oxide semiconductor (CMOS) sensor, or a bolometer.

In the embodiment of the present disclosure, when the image received from the fiber Bragg grating FBG is a visible ray, a CCD sensor or CMOS sensor may be used. In another embodiment, when the image received from the fiber Bragg grating FBG is an infrared ray, a bolometer may be used.

The imaging device IMD may include a plurality of pixels for recognizing images. The fiber Bragg grating array FBGA is provided to overlap with the imaging device IMD on the imaging device IMD. Therefore, the degree of overlapping of the fiber Bragg grating FBG and the pixels may be changed depending on a diameter of each fiber Bragg grating FBG. For example, if it is assumed that each pixel in the imaging device IMD has a size of 4 μm×4 μm, and the imaging device is a CMOS sensor having pixels of 1600× 1200, the fiber Bragg grating FBG having the core CR of 400 μm may occupy pixels of 96×96. Therefore, the number of fiber Bragg gratings FBG disposed to overlap with the entire imaging device IMD may be about 192. If the imaging device IMD is a device for detecting visible rays, the wavelength band in a visible range may be divided into 192 wavelength bands, the divided wavelength bands may be filtered by the fiber Bragg gratings FBG, respectively. In the embodiment of the present disclosure, the fiber Bragg grating FBG may be provided in different numbers depending on a degree of overlapping of the pixels in the imaging device, a size of the pixels, a radius of the fiber Bragg grating FBG, etc. In addition, it will be apparent that the fiber Bragg grating FBG may be provided in a smaller number by increasing the distance between the fiber Bragg grating FBG and the imaging device IMD through optical calculation.

A microlens array MLA and a lens module LM, which focus an image from a subject on the fiber Bragg grating FBG, may be provided between the fiber Bragg grating FBG and the subject.

The lens module LM may include at least one lens, and provides the image from the subject to the microlens array MLA. The lens module LM is used to focus the image, and its kind, shape, etc. is not particularly limited.

The microlens array MLA may include a plurality of microlenses ML. The microlenses ML may be arranged in various forms, corresponding to the arrangement of the fiber Bragg gratings FBG, but the arrangement of the microlenses ML is not particularly limited. In the embodiment of the present disclosure, the microlenses ML may be arranged as shown in FIG. 1.

The microlenses ML may be arranged one-to-one, one-to-many, or many-to-one corresponding to the fiber Bragg gratings FBG. In the embodiment of the present disclosure, the microlenses ML are arranged one-to-one corresponding to the fiber Bragg gratings FBG, to provide an image from the subject to each fiber Bragg grating FBG.

The microlens ML is used to focus the image, and its kind, shape, etc. is not particularly limited. For example, the microlens ML may be provided in the shape of a convex lens convex in the direction of the subject.

In the embodiment of the present disclosure, a controller CTL may be provided to the imaging device IMD. The controller CTL receives the digital image signal converted by the imaging device IMD, and controls the imaging device IMD.

The microlens array MLA increases the brightness of an image provided to the imaging device IMD. In addition, the microlenses ML may focus the image one-to-one corresponding to the fiber Bragg gratings FBG. The image is reproduced by each microlens ML to be input into a fiber Bragg grating FBG corresponding to the microlens ML. The input image is filtered for each wavelength by the optical filter Bragg grid FBG to be spectrally divided through the pixels of the imaging device IMD.

Figure 3:
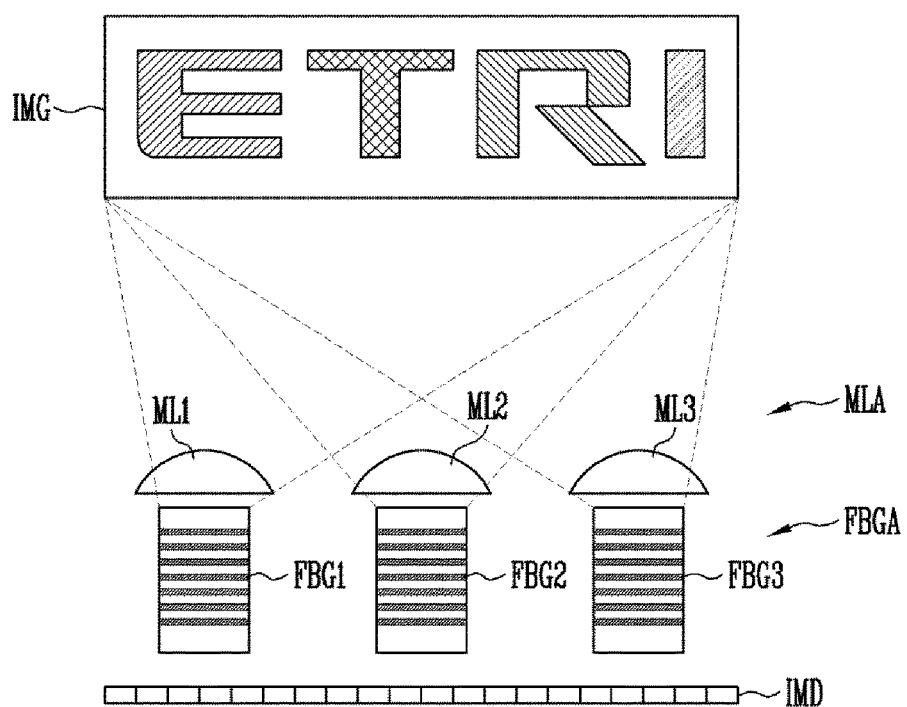
FIG. 3 is a view illustrating a state in which an image is sensed using the imaging sensor according to the embodiment of the present disclosure.

FIG. 3 is a view illustrating a state in which an image is sensed using the imaging sensor according to the embodiment of the present disclosure. In FIG. 3, for convenience of illustration, the lens module and the controller in the imaging sensor are omitted. Also, for convenience of illustration, an original image of a subject is composed of letters, so called "ETRI," and it is assumed that "E" and "I" of "ETRI" have blue, "T" of "ETRI" has green, and "R" of "ETRI" has red.

Referring to FIG. 3, the imaging sensor according to the embodiment of the present disclosure is placed on a subject to obtain an image. The imaging sensor may be placed on the image such that the microlens array MLA, the fiber Bragg grating array FBGA, and the imaging device IMD are sequentially disposed from the image.

In the imaging sensor, the fiber Bragg grating array FBGA may have fiber Bragg gratings FBG for filtering different wavelength bands. The fiber Bragg grating may be provided in various numbers. However, in the embodiment of the present disclosure, it is illustrated that, for convenience of description, the fiber Bragg grating array FBGA has three fiber Bragg gratings FBG i.e., a first fiber Bragg grating FBG1, a second fiber Bragg grating FBG2, and a third fiber Bragg grating FBG3.

In the imaging sensor, the microlens array MLA is provided corresponding to the fiber Bragg grating array FBGA. Hence, the microlens array MLA may include first to third microlenses ML1, ML2, and ML3 respectively corresponding to the first to third fiber Bragg gratings FBG1, FBG2, and FBG3.

The fiber Bragg gratings FBG filter different wavelength bands. For example, when the fiber Bragg grating FBG filters a visible wavelength band (380 nm to 750 nm), the first fiber Bragg grating FBG1 may filter rays having wavelengths that are equal to or greater than 380 nm and less than 495 nm, the second fiber Bragg grating FBG2 may filter rays having wavelengths that are equal to or greater than 495 nm and less than 570 nm, and the third fiber Bragg grating FBG3 may filter rays having wavelengths that are equal to or greater than 570 nm and less than 750 nm.

Figure 4A:
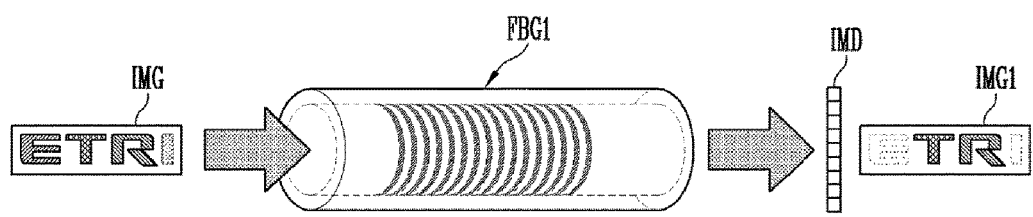
FIGS. 4A to 4C are views illustrating states in which the image is filtered by first to third fiber Bragg gratings.
Figure 4B:
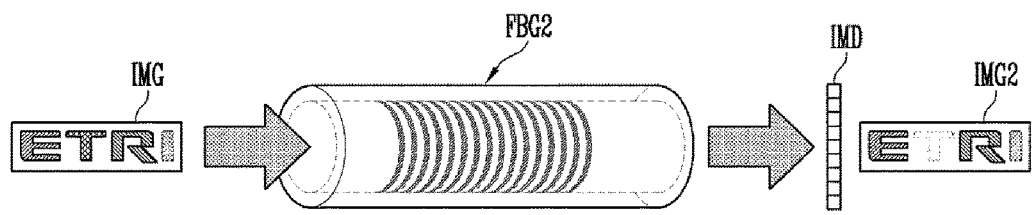
Figure 4C:
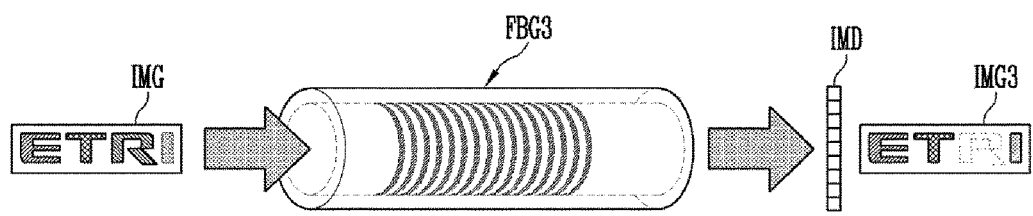

FIGS. 4A to 4C are views illustrating states in which the image is filtered by the first to third fiber Bragg gratings FBG1, FBG2, and FBG3. In FIGS. 4A to 4C, an original image IMG of the subject and images provided to the imaging device IMD are illustrated together.

Referring to FIG. 4A, the image IMG of the subject is provided to the first fiber Bragg grating FBG1 through the first microlens ML1. The first fiber Bragg grating FBG1 filters rays having wavelengths that are equal to or greater than 380 nm and less than 495 nm, which correspond to the blue. Hence, rays having wavelengths corresponding to the blue are removed in a first image IMG1 passing through the first fiber Bragg grating FBG1. Accordingly, "E" and "I" corresponding to the blue among the letters of "ETRI" do not exist in the first image IMG1, and signals of "T" and "R" can be obtained.

Referring to FIG. 4B, the image IMG of the subject is provided to the second fiber Bragg grating FBG2 through the second microlens ML2. The second fiber Bragg grating FBG2 filters rays having wavelengths that are equal to or greater than 495 nm and less than 570 nm, which correspond to the green. Hence, rays having wavelengths corresponding to the green are removed in a second image IMG2 passing through the second fiber Bragg grating FBG2. Accordingly, "T" corresponding to the green among the letters of "ETRI" does not exist in the second image IMG2, and signals of "E," "R," and "I" can be obtained.

Referring to FIG. 4C, the image IMG of the subject is provided to the third fiber Bragg grating FBG3 through the third microlens ML3. The third fiber Bragg grating FBG3 filters rays having wavelengths that are equal to or greater than 570 nm and less than 750 nm, which correspond to the red. Hence, rays having wavelengths corresponding to the red are removed in a third image IMG3 passing through the third fiber Bragg grating FBG3. Accordingly, "R" corresponding to the red among the letters of "ETRI" does not exist in the third image IMG3, and signals of "E," "T," and "I" can be obtained.

Referring back to FIG. 3, the imaging device IMD receives the first to third images IMG1, IMG2, and IMG3 that respectively pass through the first to third fiber Bragg gratings FBG1, FBG2, and FBG3. The received first to third images IMG1, IMG2, and IMG3 may be computed by the controller CTL, and accordingly, image information of the subject can be obtained.

In this embodiment, it has been illustrated the number of the fiber Bragg gratings is three. However, when the fiber Bragg grating is added, the wavelength band in which each fiber Bragg grating filters rays may become narrow. In this case, more detailed image information can be obtained. For example, the visible wavelength band may be divided into 100 wavelength bands such that the wavelength bands correspond to the fiber Bragg gratings for every wavelength. In this case, the fiber Bragg gratings obtain image information for every wavelength.

Referring back to FIGS. 1 and 2A, the imaging sensor according to the embodiment of the present disclosure configured as described above may be manufactured as at least one fiber Bragg grating FBG is formed, and an imaging device IMD for converting an image transmitted through the fiber Bragg grating FBG into a digital signal is disposed at the fiber Bragg grating FBG.

The fiber Bragg grating FBG may be formed by doping germanium into a core CR, forming a clad CLD surrounding the core CR, and then irradiating ultraviolet rays onto the core CR using a mask. Here, the mask includes first regions and second regions, which are alternately disposed. The first regions and the second regions of the mask respectively correspond to first regions RG1 and second regions RG2, which are to be formed in the fiber Bragg grating FBG. One of the first and second regions of the mask allows the ultraviolet rays to be transmitted therethrough, and the other of the first and second regions of the mask blocks the ultraviolet rays. The mask is disposed over the core CR of the fiber Bragg grating FBG, and the ultraviolet rays are irradiated onto the mask, so that the first regions RG1 and the second regions RG2, which have different refractive indices, are formed in the core CR.

In the embodiment of the present disclosure, a microlens array may be disposed in front of the fiber Bragg grating to be spaced apart from the fiber Bragg grating or to contact the fiber Bragg grating. Also, in the embodiment of the present disclosure, a lens module may be disposed in front of the microlens array to be spaced apart from the microlens array or to contact the microlens array.

The imaging sensor according to the embodiment of the present disclosure can be manufactured using a simple process described above.

The imaging sensor according to the embodiment of the present disclosure uses a snapshot method of acquiring spectral images of a subject at a time. Since the imaging sensor divides an image into virtual regions and acquires a spectral image for each region, the imaging time of the imaging sensor is short. On the other hand, in a method of performing imaging by scanning a subject, the time required to acquire spectral images is long, and it is difficult to process a large amount of information.

In the existing arts, snapshot imaging was possible, but bulk optics, a filter array, or a coded filter was used to perform imaging. However, it is difficult to minimize the bulk optics, the filter array is to be manufactured using a semiconductor process, and the coded filter requires high computing power for imaging processing. Particularly, the existing filter arrays have a wavelength resolution of 5 nm or more, which is low, as compared with the imaging sensor according to the embodiment of the present disclosure.

On the other hand, the imaging sensor according to the embodiment of the present disclosure can be minimized, and a semiconductor process is not performed to manufacture the imaging sensor. Further, high computing power is not required, and the imaging sensor can be easily manufactured at low cost.

By using the imaging sensor, it is possible to obtain two-dimensional information and properties of a substance, particularly, optical information (wavelengths and frequencies). The imaging sensor according to the embodiment of the present disclosure may be used in fields using spectral image information, such as crop screening, food selection, skin cancer detection, and target detection, but the present disclosure is not limited thereto.

Figure 5:
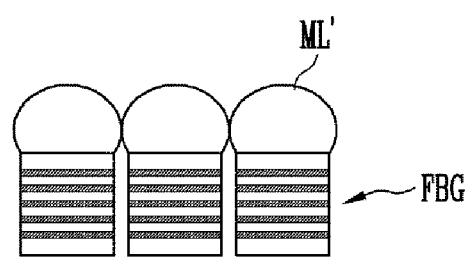
FIG. 5 is a view illustrating fiber Bragg gratings and microlenses in an imaging sensor according to another embodiment of the present disclosure.

FIG. 5 is a view illustrating fiber Bragg gratings and microlenses in an imaging sensor according to another embodiment of the present disclosure.

In the imaging sensor according to the embodiment of the present disclosure, a microlens ML' may be provided in the form in which it is attached to one end of each fiber Bragg grating FBG. That is, the microlens ML' corresponding to each fiber Bragg grating FBG is not separated from the one end of the corresponding fiber Bragg grating FBG but may be integrally formed with the corresponding fiber Bragg grating FBG. In this case, the microlens ML' provided at the end of the fiber Bragg grating FBG may be manufactured by performing arc discharge on an end of an optical fiber. Since the microlens ML' is formed at the end of each fiber Bragg grating FBG, a separate microlens array is not provided. Thus, a single module of the fiber Bragg grating FBG and the microlens ML' can be manufactured without any separate microlens array.

According to the present disclosure, the imaging sensor has a high resolution and a short time required to acquire spectral images. Also, the imaging sensor can be miniaturized, and a semiconductor process is not performed to manufacture the imaging sensor. Further, high computing power is not required, and the imaging sensor can be easily manufactured at low cost.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An imaging sensor comprising:
a fiber Bragg grating array configured to filter an image from a subject according to wavelength bands;
an imaging device configured to convert an image transmitted through the fiber Bragg grating array into a digital signal, the fiber Bragg grating array being arranged opposite to the imaging device; and
a microlens array configured to focus an image provided to the fiber Bragg grating array, and arranged opposite to the fiber Bragg grating array, with the fiber Bragg grating array between the imaging device and the microlens array;
wherein
each microlens of the microlens array is located at an end of a core of a corresponding fiber Bragg grating of the fiber Bragg grating array, and a surface of the microlens facing the end of the core is substantially parallel to the corresponding fiber Bragg grating,
the imaging device includes a total number of pixels, and each fiber Bragg grating of the fiber Bragg grating array is configured to overlap a predetermined number, smaller than the total number and greater than one, of pixels out of the total number of pixels, and to filter a divided wavelength band, different from another divided wavelength band among divided wavelength bands of a visible wavelength band, each divided wavelength band corresponding to a division of the visible wavelength band by a number of fiber Bragg gratings of the fiber Bragg grating array needed to overlap the total number of pixels.

2. The imaging sensor of claim 1, wherein a fiber Bragg grating of the fiber Bragg grating array includes a core and a clad surrounding the core, and the core is doped with germanium.

3. The imaging sensor of claim 2, wherein the fiber Bragg grating includes a first region and a second region, which have different refractive indices from each other.

4. The imaging sensor of claim 3, wherein each of the first region and the second region is provided in plurality, and the plurality of first regions and the plurality of second regions are alternately disposed.

5. The imaging sensor of claim 1, wherein each microlens of the microlens array is provided one-to-one corresponding to a fiber Bragg grating of the fiber Bragg grating array.

6. The imaging sensor of claim 5, wherein the microlens and the fiber Bragg grating corresponding thereto are integrally inseparably formed with each other.

7. The imaging sensor of claim 5, wherein the microlens is formed in the shape of a convex lens protruding in a direction of the subject.

8. The imaging sensor of claim 1, further comprising a controller configured to receive the digital signal converted by the imaging device and control the imaging device.

9. The imaging sensor of claim 8, wherein the imaging device is a charge coupled device (CCD) sensor, a complementary metal oxide semiconductor (CMOS) sensor, or a bolometer.

10. A method of manufacturing an imaging sensor, the method comprising:
arranging an imaging device opposite to a fiber Bragg grating array, wherein the imaging device converts an image transmitted through the fiber Bragg grating array;
arranging a microlens array opposite to the fiber Bragg grating array, with the fiber Bragg grating array between the imaging device and the microlens array;
wherein
each microlens of the microlens array is located at an end of a core of a corresponding fiber Bragg grating of the fiber Bragg grating array so that a surface of the microlens facing the end of the core is substantially parallel to the fiber Bragg grating;
including a total number of pixels in the imaging device; and
configuring each fiber Bragg grating of the fiber Bragg grating array to overlap a predetermined number, smaller than the total number and greater than one, of pixels out of the total number of pixels, and to filter a divided wavelength band, different from another divided wavelength band among divided wavelength bands of a visible wavelength band, each divided wavelength band corresponding to a division of the visible wavelength band by a number of fiber Bragg gratings of the fiber Bragg grating array needed to overlap the total number of pixels.

11. The method of claim 10, wherein the forming of the fiber Bragg grating includes:
doping germanium into the core;
forming a clad surrounding the core; and
irradiating ultraviolet rays onto the core using a mask.

12. The method of claim 11, wherein the mask includes first regions and second regions, which are alternately disposed.

13. The method of claim 10, wherein the microlens is spaced apart from the fiber Bragg grating.

14. The method of claim 10, wherein the microlens is provided one-to-one corresponding to the fiber Bragg grating, and
the microlens and the fiber Bragg grating corresponding thereto are integrally inseparably formed with each other.

15. The method of claim 14, wherein the microlens is formed by performing arc discharge on an end of the fiber Bragg grating.

* * * * *